(12) United States Patent
Westeñdorf et al.

(10) Patent No.: US 7,761,869 B2
(45) Date of Patent: Jul. 20, 2010

(54) METHOD FOR GENERATING A COMPUTER PROGRAM AND A COMPUTER PROGRAM PRODUCT

(75) Inventors: Frank Westeñdorf, Ubstadt-Weiher (DE); Martin Gaub, Wiesloch (DE)

(73) Assignee: SAP AG, Walldorf (DE)

( * ) Notice: Subject to any disclaimer, the term of this patent is extended or adjusted under 35 U.S.C. 154(b) by 1195 days.

(21) Appl. No.: 10/642,153

(22) Filed: Aug. 18, 2003

(65) Prior Publication Data
US 2004/0177356 A1 Sep. 9, 2004

(30) Foreign Application Priority Data

Mar. 6, 2003 (DE) ................................. 103 10 998
Mar. 31, 2003 (WO) ....................... PCT/EP03/03352

(51) Int. Cl.
*G06F 9/445* (2006.01)
*G06F 9/44* (2006.01)

(52) U.S. Cl. ........................ 717/175; 717/120
(58) Field of Classification Search ....................... None
See application file for complete search history.

(56) References Cited

U.S. PATENT DOCUMENTS 5,721,824 A * 2/1998 Taylor ........................ 709/203
6,282,711 B1 8/2001 Halpern et al.
6,301,707 B1 10/2001 Carroll et al.
6,681,391 B1 * 1/2004 Marino et al. ............... 717/175
6,698,018 B1 * 2/2004 Zimniewicz et al. ........ 717/175
6,725,452 B1 * 4/2004 Te'eni et al. ................ 717/168
2002/0133814 A1 9/2002 Bourke-Dunphy et al.
2002/0191014 A1 12/2002 Hsieh et al.

FOREIGN PATENT DOCUMENTS

EP 0 802 480 A1 10/1997

OTHER PUBLICATIONS

Red Hat Linux 7.2, The Offical Red Hat Linux x86 Installation Guide, 2001 Red Hat , Inc, p. 13-82.*
"Table-Driven Selective Software Download", IBM Technical Disclosure Bulletin, vol. 32, No. 9B, Feb. 1, 1990, pp. 40-41.

* cited by examiner

*Primary Examiner*—Tuan Q Dam
*Assistant Examiner*—Zheng Wei
(74) *Attorney, Agent, or Firm*—Finnegan, Henderson, Farabow, Garrett & Dunner LLP

(57) ABSTRACT

A method for generating a computer program and a computer program setup system are provided, wherein the computer program is divided into a plurality of packages in a modular manner, the packages representing in their entirety the complete computer program and being individually selectable by a user when installing the computer program on a computer system in order to create a customized computer program.

5 Claims, 3 Drawing Sheets

METHOD FOR GENERATING A COMPUTER PROGRAM AND A COMPUTER PROGRAM PRODUCT

FIELD OF THE INVENTION

The present invention relates to the field of generating computer programs and, more particularly, to a method for generating a computer program which can be easily customized by a user installing the computer program. The invention further relates to a computer program product with a computer-readable medium and a computer program stored on the computer-readable medium with program coding means which are suitable for carrying out such a method when the computer program is run on a computer system.

BACKGROUND INFORMATION

In the field of computer program technology, it is known to pack large computer programs before they are stored on a suitable carrier in case the computer program is too large for the space available on the computer program carrier. In the case of very large programs, it is also known to divide a program into several packages of a size fitting on a given storage carrier. When the computer program is installed, the user loads the content of the more than one data carriers onto his/her computer where the packages are put back together when unpacked in order to generate the computer program on the computer system of the user.

It is also known that a computer program, upon installation by a user, can be customized. For this, the installation or setup routine of the program comprises an interactive window which can be used by the user to define whether the user wishes standard settings or customized settings to be set up. In cases where the user opts for customized settings, there are computer programs which ask for an extensive amount of setup details to be provided by the user in order to design the desired "shape" of the computer program.

However, this requires a profound knowledge of the design and the design possibilities of the computer program to be installed on behalf of the user. Further, the customized installation of a complex computer program takes a very long time.

SUMMARY OF THE INVENTION

It is therefore an object of the invention to provide a method for generating and for installing a computer program, as well as a setup system for a computer program, which overcome the disadvantages known in the prior art. More particularly, it is an object of the invention to provide a method for generating and for installing a computer program and a setup system for a computer program which allows a user to generate and design a customized computer program quickly and easily and without being required to have profound knowledge of the computer program to be installed. Such objects are achieved by the methods, set up systems, computer program products and related features disclosed herein.

In accordance with embodiments of the present invention, a method is provided for generating and for installing a computer program, wherein the method facilitates all possible parts of the computer program, such as functions, process descriptions, table and/or object design descriptions, table data and/or file data, configuration data, etc.

According to embodiments of the invention, a computer program may be divided into a plurality of packages in a modular manner, the packages corresponding to functional subunits of the computer program and representing in their entirety the complete computer program. The packages may be individually selectable by a user when installing the computer program on a computer system in order to create a customized computer program. This allows a user to select whole functional subunits when setting up a computer program, instead of having to select each and every function of the computer program to be "designed", i.e., to be custom-installed. Further, this enables users without detailed knowledge of computer technology and/or a given computer program to generate a customized computer program as they merely have to choose from modular packages corresponding to functional subunits of the computer program, thus allowing for fast, easy and reliable design setup of a customized computer program.

Advantageously, the plurality of packages may comprise at least one core package and at least one additional package. The core package may represent a base computer program module forming the basis for add-on computer program modules contained in the additional package(s). This allows an inexperienced user to set up a computer program correctly by selecting base modules first and subsequently building up the customized computer program by choosing add-on modules. In a preferred embodiment, each computer program comprises exactly one core package which is the basic subunit of the computer program and provides all the basic functions of the computer program, the core package being able to be installed and run independently from the additional packages which provide add-on functions.

Further features and embodiments of the present invention will become apparent from the description and the accompanying drawings.

It will be understood that the features mentioned above and those described hereinafter can be used not only in the combinations specified, but also in other combinations or on their own, without departing from the scope of the present invention.

The invention is schematically illustrated in the drawings by means of exemplary embodiments and is hereinafter explained in detail with reference to the drawings. It is understood that the description is in no way limiting on the scope of the present invention and is merely an illustration of preferred embodiments of the invention.

DETAILED DESCRIPTION

Figure 1:
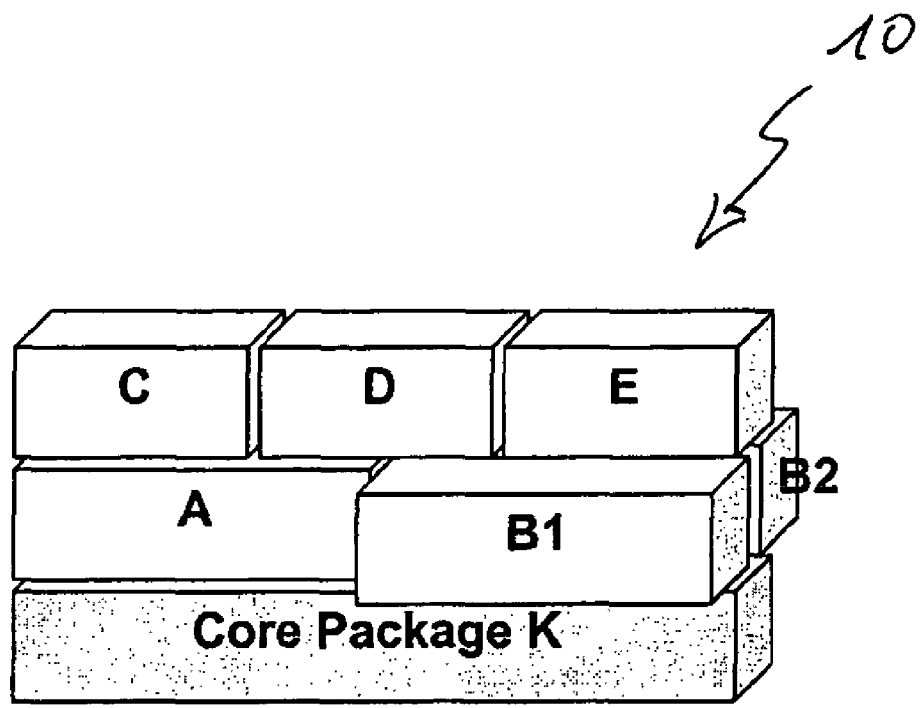
FIG. 1 is a schematic illustration of a computer program divided into a plurality of modular packages, consistent with embodiments of the invention.

FIG. 1 shows in schematic representation a computer program 10, consistent with embodiments of the invention. The computer program 10 is divided into a plurality of packages in modular manner. In the embodiment shown in FIG. 1, the computer program 10 consists of a core package K and additional packages A, B1, B2, C, D and E. Packages K and A to E represent in their entirety the complete and full computer program with all possible functions, each package comprising a functional subunit of the computer program. Each subunit of the computer program may include a multitude of functions.

Core package K may represent the smallest independent functional subunit of the computer program 10, i.e., the computer program 10 could be installed by only selecting the core package K and would then constitute a customized computer program stripped down to its basic functions.

In the additional packages A to E, all optional functions and subunits of the computer program are contained.

Core packages do not require any other packages and constitute, as described above, independent software solutions. Advantageously, a computer program according to one embodiment the invention comprises exactly one core package which determines the nature of the computer program. This means that core packages cannot be combined with other core packages, but only with additional packages. This makes the set up of a customizes computer program very easy for a user. Each of the additional packages requires at least one further package, i.e., a core package or another additional package. Selection of the additional packages determines the scope of the software solution. However, it is also possible to provide a computer program with more than one core package, which would then allow for a user to choose between different sets of basic functions.

Packages can have various relations as to prerequisites or conditions, with a more complex logic being allowed. For example, in the embodiment of FIG. 1, core package K is a prerequisite for additional package A (A$\Rightarrow$K), or in other words additional package A requires core package K. Further, additional package C requires additional package A (C$\Rightarrow$A), additional package E requires either additional package B1 or B2 (E$\Rightarrow$B1$\vee$B2) and additional package D requires additional package A and either additional package B1 or additional package B2 (D$\Rightarrow$A$\wedge$(B1$\vee$B2)). There is also the possibility that two packages bar each other as it is the case for additional packages B1 and B2 in the example of FIG. 1 ($\neg$(B1$\vee$B2) or B1$\Rightarrow\neg$B2, B2$\Rightarrow\neg$B1). While the bar is symmetrical, the prerequisite is anti-symmetrical, i.e., two packages may not require each other.

If an overlap results in the content of two packages, there might be a conflict when both packages are selected. There are three remedies or options to such a conflict which can find use alternatively or cumulatively. The first option is to prohibit concurrent selection of certain packages. Incompatible packages, like packages B1 and B2 in the example of FIG. 1, may have unlimited overlap. A second option is to implement rules of dominance, e.g., for packages of different status or rank (as for example packages A and C in the example of FIG. 1) it applies that the higher package (here: C) dominates and may modify settings of the lower package (here: A). The third option consists in prohibiting overlaps for packages of the same status or rank (e.g., packages C and D in the example of FIG. 1).

Figure 2:
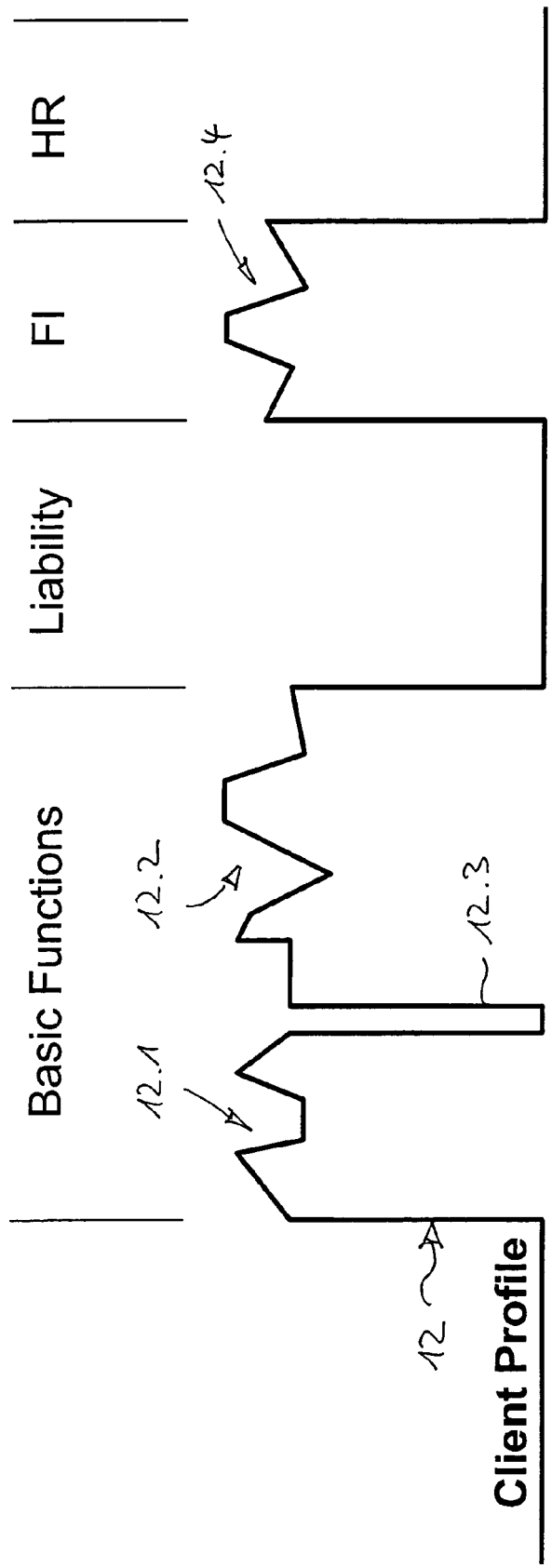
FIG. 2 is a schematic illustration of a requirement profile of a user towards a computer program, consistent with embodiments of the invention.
Figure 3:
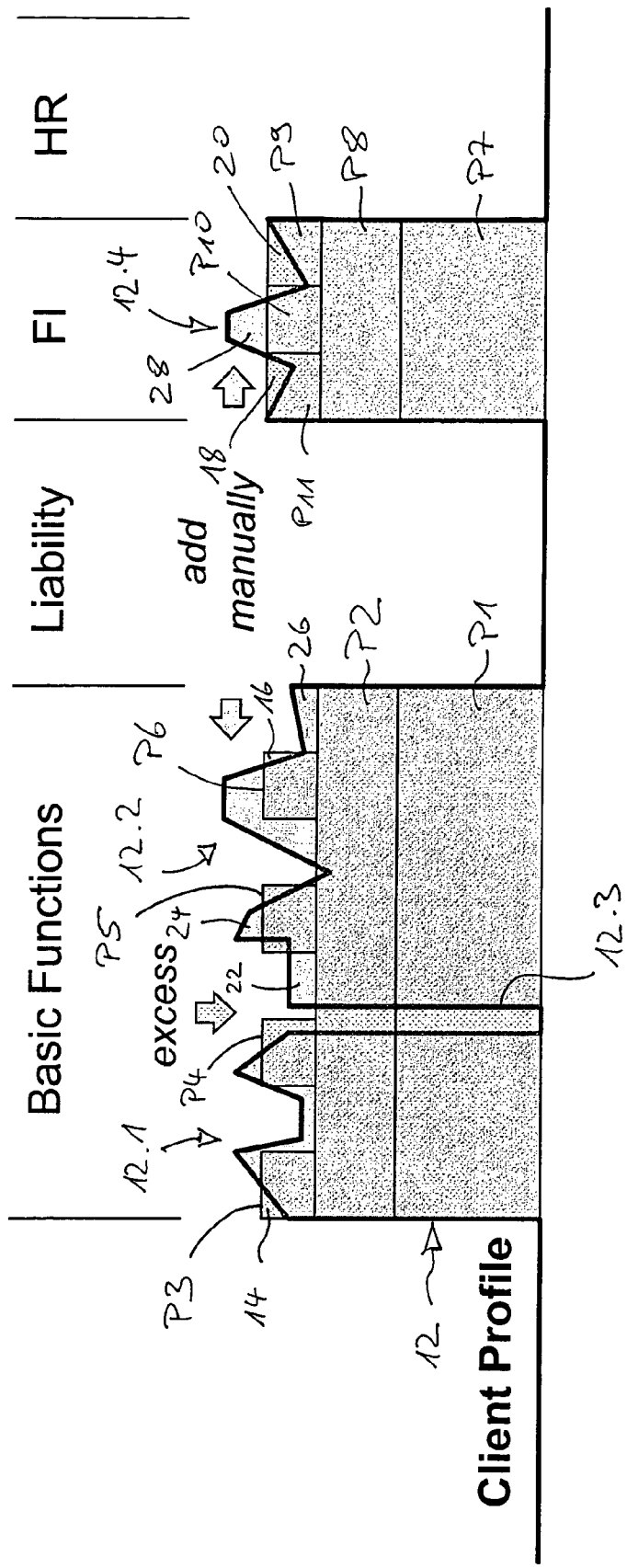
FIG. 3 is a schematic illustration of how the requirement profile of FIG. 2 may be met with a customized computer program generated according to embodiments of the invention.

Referring now to FIGS. 2 and 3, FIG. 2 shows a schematic client profile 12 representing the requirement of a client or user as to the desired functions of the software to be installed and customized. In the example of FIG. 2, the software to be installed is a computer program in the field of commission payments offering basic functions as well as functions in the fields of Liability, Finance (FI) and Human Resources (HR). According to the client requirement profile of FIG. 2, the client desires certain basic functions 12.1 and 12.2, however with a gap 12.3 in the profile of the basic functions which means that the client does not need the function(s) corresponding to the gap 12.3. In the fields of Liability and HR, the profile is flat which means that the client does not wish any function in these fields. However, in the field of FI, the client wishes to have functions according to a profile 12.4.

In order to generate a computer program corresponding as close as possible to the profile 12 of FIG. 2, the client or user selects certain packages when installing or setting up the computer program. First, as illustrated in FIG. 3, the user selects a core package of the computer program which is package P1, and subsequently selects a first additional package P2 which builds up on the core package P1. With these two packages, the main portion of the desired basic functions is already available. However, in order to reproduce the fine profile 12.1 and 12.2 of the basic functions, user further selects smaller additional packages P3, P4, P5 and P6 (the packages are shown as rectangles and squares which is for illustrated purposes only).

In the fields of Liability and HR, the user does not select any packages, but in the field of FI the user selects a first package P7 which provides for the basic functions of the Finance module and further additional packages P8, P9, P10 and P11 in order to reproduce as finely as possible the profile 12.4.

As can easily be seen from the illustration of FIG. 3, it is barely possible to reproduce a fine profile by means of (rectangular) packages. The result is that in some areas there are excess functions (i.e., functions on top of the desired profile) available as for example in the gap 12.3 or in the areas depicted with reference numerals 14, 16, 18 and 20, and in other areas functions which were required are missing as these functions are not covered by the selected packages, as for example in the areas depicted with reference numerals 22, 24, 26 and 28.

The functions missing could be added in a conventional manner by selecting these functions from a menu containing all available functions one after the other (assuming that the software basically provides these functions), and the excess functions could be left or—in case they waste valuable storage—could be de-installed in a conventional manner by choosing the corresponding functions from a menu of all functions one after the other.

Advantageously, the process of setting up a computer program according to embodiments of the invention may be designed very user friendly by providing, for example, a list of all packages of the computer program to the user who can select (via an appropriate device like keyboard or mouse) the desired packages, with the selected packages appearing in a second list. Once the user has begun to select packages, indication elements appear next to the remaining packages in the list of available packages, indicating whether a package can be selected additionally to the packages already selected, whether a package requires further packages and/or whether a package is incompatible with a package already selected.

Embodiments of the invention thus provide a useful tool in generating computer programs and installing such a computer program in order to create a customized computer program. Handling for users, particularly for inexperienced users, is simplified and setup time is minimized. Due to the modular concept of the packages constituting the computer program in contrast to the "atomised" design of conventional custom setup systems. With embodiments of the invention it also becomes possible to ship parts of a computer program separately, which leads to an enhanced flexibility of a software producer as well as the software client.

What is claimed is:

1. A method of installing a computer program, divided into a plurality of packages in modular manner, the packages representing in their entirety the complete computer program and being individually selectable by a user when installing the computer program on a computer system in order to create a customized computer program, the packages being sorted hierarchically, with packages ranking higher in the hierarchy being dependent on and dominating packages ranking lower in the hierarchy, the method comprising:

defining a graphical user interface representation of a profile of functions required to be performed by the computer program to be installed;

providing rules of dominance relating to the ranks of the packages among each other, wherein the rules of dominance apply in case the package selection by the user results in a conflict of the content of at least two of the packages, the rules of dominance further indicating that a package with a higher rank in the hierarchy that is dependent on a package with a lower rank in the hierarchy dominates the package with the lower rank and, therefore, modifies settings of the lower package to solve any conflict of the content of the at least two of the packages;

selecting a first package from the plurality of packages, the first package being a core package of the computer program to be installed, containing basic functions of the computer program to be installed, and representing an independent functional subunit of the computer program to be installed;

subsequently selecting, on the basis of the first package, a second package from the plurality of packages, the second package providing computer program functions building up on the selected first package while observing the provided rules of dominance;

comparing the functions of the selected first and second packages to the graphical user interface representation of the profile of functions;

applying at least one of the rules of dominance when there is a conflict in content between the selected first package and the selected second package; and subsequently selecting additional packages from the plurality of packages until the functions of the selected packages fit within or exceed the defined graphical user interface representation of the profile of functions, wherein the exceeded functions of the selected packages are de-installed in order to reproduce a finely matched profile of functions as the defined graphical user interface representation of the profile of functions.

2. The method according to claim 1, wherein the plurality of packages is packed.

3. The method according to claim 1, wherein each of the plurality of packages represents a functional subunit of the computer program.

4. A computer-readable medium with a computer program stored thereon, the computer program being divided into a plurality of packages in modular manner, the packages representing in their entirety the complete computer program, the computer-readable medium further comprising instructions which are executable by a processor to perform a method for installing a customized version of the computer program on a computer system, the packages being sorted hierarchically, with packages ranking higher in the hierarchy being dependent on and dominating packages ranking lower in the hierarchy, the method comprising:

defining a graphical user interface representation of a profile of functions required to be performed by the computer program to be installed;

providing rules of dominance relating to the ranks of the packages among each other, wherein the rules of dominance apply in case the package selection by the user results in a conflict of the content of at least two of the packages, the rules of dominance further indicating that a package with a higher rank in the hierarchy that is dependent on a package with a lower rank in the hierarchy dominates the package with a lower rank and, therefore, modifies settings of the lower package to solve any conflict of the content of the at least two of the packages;

selecting a first package from the plurality of packages, the first package being a core package of the computer program to be installed, containing basic functions of the computer program to be installed, and representing an independent functional subunit of the computer program to be installed;

subsequently selecting, on the basis of the first package, a second package from the plurality of packages, the second package providing computer program functions building up on the selected first package while observing the provided rules of dominance;

comparing the functions of the selected first and second packages to the graphical user interface representation of the profile of functions;

applying at least one of the rules of dominance when there is a conflict in content between the selected first package and the selected second package; and subsequently selecting additional packages from the plurality of packages until the functions of the selected packages fit within or exceed the defined graphical user interface representation of the profile of functions, wherein the exceeded functions of the selected packages are de-installed in order to reproduce a finely matched profile of functions as the defined graphical user interface representation of the profile of functions.

5. The computer-readable medium according to claim 4, wherein each of the plurality of packages represents a functional subunit of the computer program.

* * * * *